(12) United States Patent
Lindskog

(10) Patent No.: US 7,221,699 B1
(45) Date of Patent: May 22, 2007

(54) EXTERNAL CORRECTION OF ERRORS BETWEEN TRAFFIC AND TRAINING IN A WIRELESS COMMUNICATIONS SYSTEM

(75) Inventor: Erik D. Lindskog, Sunnyvale, CA (US)

(73) Assignee: ArrayComm LLC, San Jose, CA (US)

( * ) Notice: Subject to any disclaimer, the term of this patent is extended or adjusted under 35 U.S.C. 154(b) by 1060 days.

(21) Appl. No.: 10/186,475

(22) Filed: Jun. 28, 2002

(51) Int. Cl.
*H04L 27/30* (2006.01)

(52) U.S. Cl. ............ 375/147; 375/260; 375/340; 375/349; 375/371; 370/516; 455/276.1

(58) Field of Classification Search ........ 375/141, 375/147, 260, 340, 344, 345, 349, 371; 370/320, 370/335, 342, 516; 455/276.1
See application file for complete search history.

(56) References Cited

U.S. PATENT DOCUMENTS

| | | | |
|---|---|---|---|
| 6,320,853 B1 | 11/2001 | Wong et al. | |
| 6,683,907 B2 * | 1/2004 | Ling | 375/147 |
| 6,853,631 B1 * | 2/2005 | Nakamura et al. | 370/342 |

FOREIGN PATENT DOCUMENTS

| | | |
|---|---|---|
| DE | 10026077 A1 | 12/2001 |
| WO | WO01/63776 A2 | 8/2001 |

OTHER PUBLICATIONS

Lindskog et al., "A Transmit Diversity Scheme for Channels with Intersymbol Interference", ICC 2000, Jun. 2000, vol. 1, pp. 307-311.
Pedersen et al., "A Simple Downlink Antenna Array Algorithm Based on a Hybrid Scheme of Transmit Diversity and Conventional Beamforming", 2001 IEEE, pp. 58-62.

* cited by examiner

*Primary Examiner*—Dac V. Ha
(74) *Attorney, Agent, or Firm*—Blakely Sokoloff Taylor & Zafman LLP

(57) ABSTRACT

A method and apparatus are provided that allows a training and traffic signal to be compensated for phase errors without modifying a receiver. In one embodiment, the invention encompasses an external error correction circuit having a signal input to receive training and traffic channel signals from a receive chain, a signal processing circuit to compute phase corrections to at least one of the training and traffic channel signals, and a signal generator to supply a compensation signal to effect the computed correction.

42 Claims, 6 Drawing Sheets

EXTERNAL CORRECTION OF ERRORS BETWEEN TRAFFIC AND TRAINING IN A WIRELESS COMMUNICATIONS SYSTEM

BACKGROUND OF THE INVENTION

1. Field of the Invention

The present invention relates generally to the field of digital radio signal communications. More particularly, the invention relates to correcting for errors between a training signal and a traffic signal, for example phase errors between a beamformed traffic channel and a sector-wide pilot channel using an external device.

2. Description of the Related Art

Many wireless data communication systems use training information or pilot signals that the receiving terminal uses to demodulate received traffic, control, overhead or other signals. One such example is the pilot signal transmitted by a base station in a CDMA (code division multiple access) communications system. Typically a single common pilot signal is transmitted to all remote or subscriber terminals in the base station's coverage area. The coverage area of the base station is typically referred to as a sector. Any signals transmitted to any particular user terminal can then be resolved with the help of the timing and phase information in the common pilot signal.

The pilot signal is particularly effective when the signal propagation path for both the pilot and the user-specific signal is the same. In a CDMA system in which the pilot and user-specific signal are sent over the same frequency band from the same antennas but with different scrambling codes, the pilot signal is very effective. However, any difference between signals makes the pilot signal more difficult to use or, in other words, it makes the user-specific signal more difficult to demodulate. If, for example, the user-specific signal is spatially directed toward the remote terminal and the pilot signal is a common sector-wide signal, then the two signals can traverse a different signal propagation path. This will cause the two signals, as received by the remote terminal, to differ.

The propagation channel of the pilot signal and the propagation channel of the traffic channel will differ whenever they are transmitted with beams of different width and shape. The user terminal typically uses the pilot signal to estimate a channel that then is used in the process of demodulating and detecting the symbols transmitted on the traffic channel. The difference in the propagation channel of the pilot signal and the traffic channel therefore reduces the accuracy of the channel estimate. To compensate, each user can be provided with a user-specific pilot signal but this greatly increases the amount of traffic on the network.

BRIEF SUMMARY OF THE INVENTION

A method and apparatus are provided that allows a training and traffic signal to be compensated for phase errors without modifying a receiver. In one embodiment, the invention encompasses an external error correction circuit having a signal input to receive training and traffic channel signals from a receive chain, a signal processing circuit to compute phase corrections to at least one of the training and traffic channel signals, and a signal generator to supply a compensation signal to effect the computed correction.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

In one embodiment, the present invention allows the phase error between a common pilot channel and a user-specific traffic channel to be estimated and corrected externally to a regular receive processing circuit. This can be used to improve performance and robustness of the communications channel without modifying the regular receive processing circuit.

More specifically, in one embodiment, phase and amplitude differences between pilot and traffic channel taps can be estimated external to a regular receiver circuit using information about the pilot and traffic channel codes, the temporal location of the taps and the location of possible dedicated pilot symbols. A signal can be computed that can be added to the baseband or IF signal in order to compensate the error. As a result, the phases and amplitudes of the taps of the pilot channel and the traffic channel will match better. The computed signal can be added to the pilot signal before it is processed by the regular receive circuit.

The invention is described in the context of wireless base stations for air interfaces that allow beam forming, but it is not so limited. It is particularly applicable to wireless systems in which a pilot signal typically is shared among multiple users at the same time, as is commonly required in standards for CDMA (code division multiple access) systems. Current examples of such wireless systems are WCDMA (wideband CDMA), cdma2000, IS-95 (interim standard 95 of the Telecommunications Industry Association). The present invention may also be applied to some TDMA (time division multiple access) systems such as the downlink of HDR (high data rate for CDMA) and GSM (Global System for Mobile Communications).

External Phase Error Correction Circuit

Figure 1:
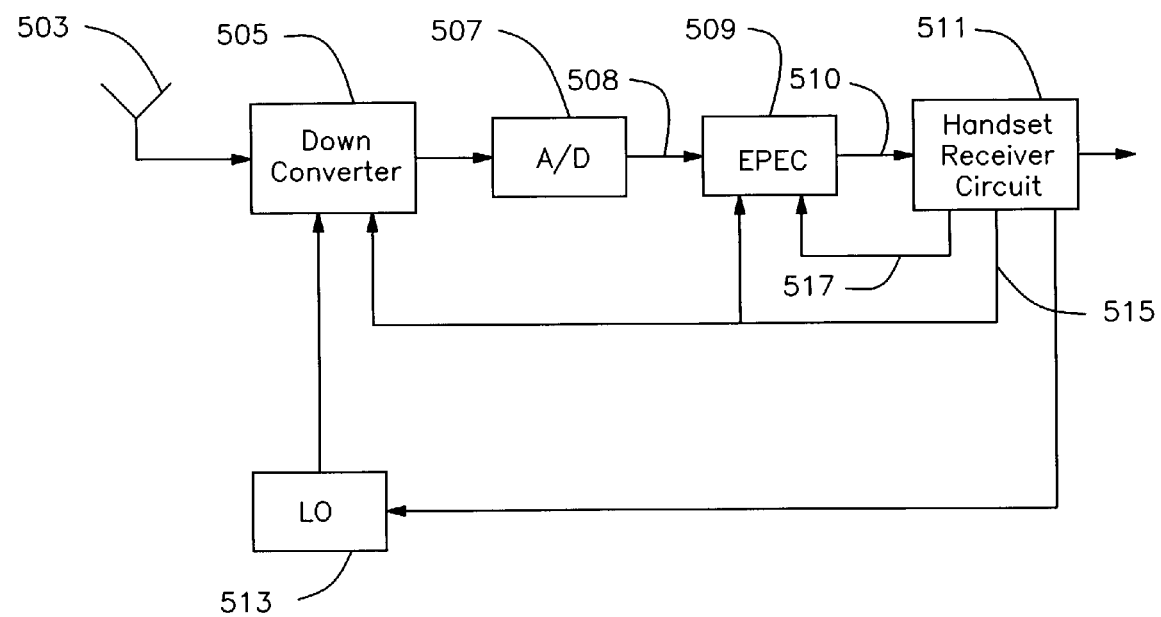
FIG. 1 is a simplified block diagram of receiver incorporating an embodiment of the invention.

FIG. 1 shows an example of a portion of a receiver that includes an external phase error correction circuit. The receiver can be a part of the base station of FIG. 3 or the remote terminal of FIG. 4. The external phase error correction circuit is not shown in either FIG. 3 or 4 but can be added to either system or many other systems as described in more detail below.

In FIG. 1, the signal, for example a sector-wide common pilot channel CPICH signal and a directed narrow beam traffic channel TCH signal is received by an antenna 503, down converted in a first multiplexer 505 to base band and sampled by an A/D (analog to digital) converter circuit 507. These components can be the antenna 4, 45, downconverter 5, 13, 48, and ADC 9, 48 of FIG. 5 or of FIG. 6. The digital base band signal 508 is fed into the external phase error correction circuit (EPEC) 509. The EPEC has interface terminals to receive information about pilot and traffic signal codes, timing information and tap delays on lines 517 from a user terminal receiver circuit 511. This can be the DSP 31 or receiver 48 of FIGS. 5 and 6.

Using this information, the EPEC estimates the error in phase between the pilot signal and the traffic signal and adds an adjustment signal to the digital base band signal that rotates the phase of the pilot signal closer to that of the traffic signal. Alternatively, the adjustment can be made to the traffic signal or to both signals. In a diversity receiver, adjustments can be made to two pilot signals or to two pilot signal and two traffic signals. The estimation and correction can be performed for each tap of the channel being used. The adjusted digital base band signal 510 is then passed on to the user terminal receiver circuit 511.

Frequency control can be provided by the user terminal receiver circuit to an LO (local oscillator) which can be applied to the down converter. Alternatively the LO can act independently as a reference source for the receiver circuit. In some embodiments the LO is based on a GPS (global positioning system) receiver that is then adjusted by the receiver circuit or another frequency control loop. AGC (automatic gain control) 515 in or before the down converter may also be controlled by the user terminal receiver circuit. The AGC signal 515 can be provided to the downconverter and the EPEC to allow it make gain corrections to the baseband signal that passes through it. A frequency control signal can also be provided to the EPEC for use in correcting for any effects caused by the frequency control.

Figure 2:
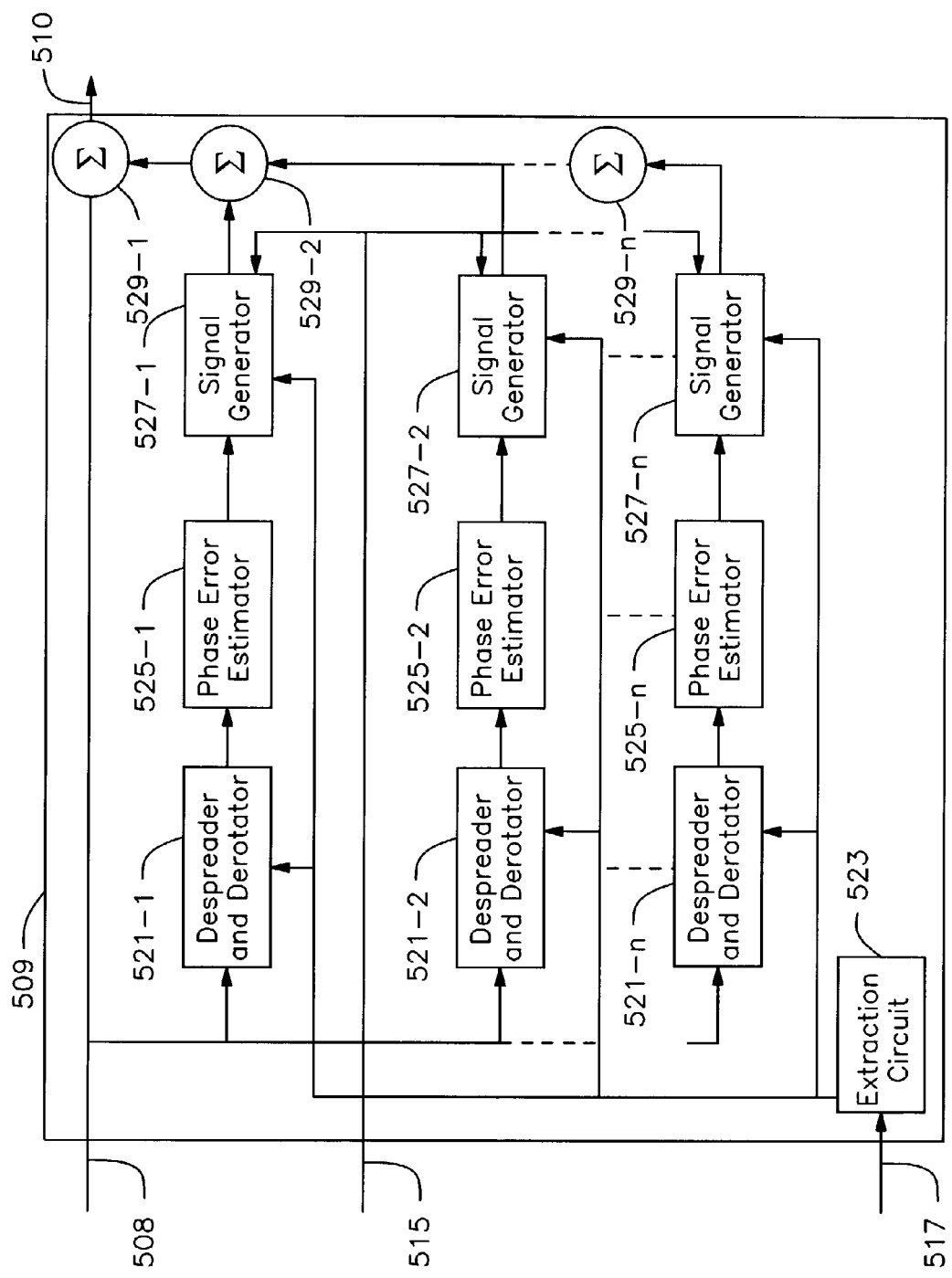
FIG. 2 is a simplified block diagram of a estimated phase error correction circuit according to an embodiment of the invention.

FIG. 2 shows an example of one embodiment of an EPEC in more detail. According to the illustrated embodiment, for each tap or finger being used in the user terminal receiver circuit 511, the digital baseband signal 508 is passed into a despreader and derotator 521-1 to 521-$n$. The information 517 about the pilot and traffic signal code and appropriate delays is also passed to the despreader and derotator circuits through an extraction circuit 523 which separates the different types of information and prepares it for use in the despreader and derotator circuits. The despreader and derotator circuits despread both the traffic signal and the pilot signal with the corresponding appropriate code and delay and then derotate the phase of the despread traffic signal with the estimated phase of the despread pilot signal. Accordingly, each despreader and derotator circuit corresponds roughly to a single finger RAKE receiver.

Each despread and derotated traffic signal is then fed into a phase error estimator circuit 525-1 to 525-$n$ that performs phase error estimation. The phase error estimation can be performed in a variety of different ways well known in the art. Alternatively, it can be done as described below. The estimated phase error is passed on to a signal generator circuit that 527-1 to 527-$n$. The signal generator circuit generates a pilot adjustment signal to be added to the original digital base band signal 508. The adjustment signal effectively rotates the phase of the original pilot signal closer to the phase of the traffic signal. If the traffic channel signal phase is also to be adjusted then two adjustment signals are generated.

The adjustment signals are each fed to respective multiplexers 529-1 to 529-$n$, which combine the adjustment signal for each tap with the received baseband signal 508 to produce the adjusted baseband signal 510. This signal is then supplied to the handset receiver circuit as described above. The adjusted signal has been corrected for phase errors between the pilot and traffic signal and can readily be demodulated using a conventional receiver.

Figure 5:
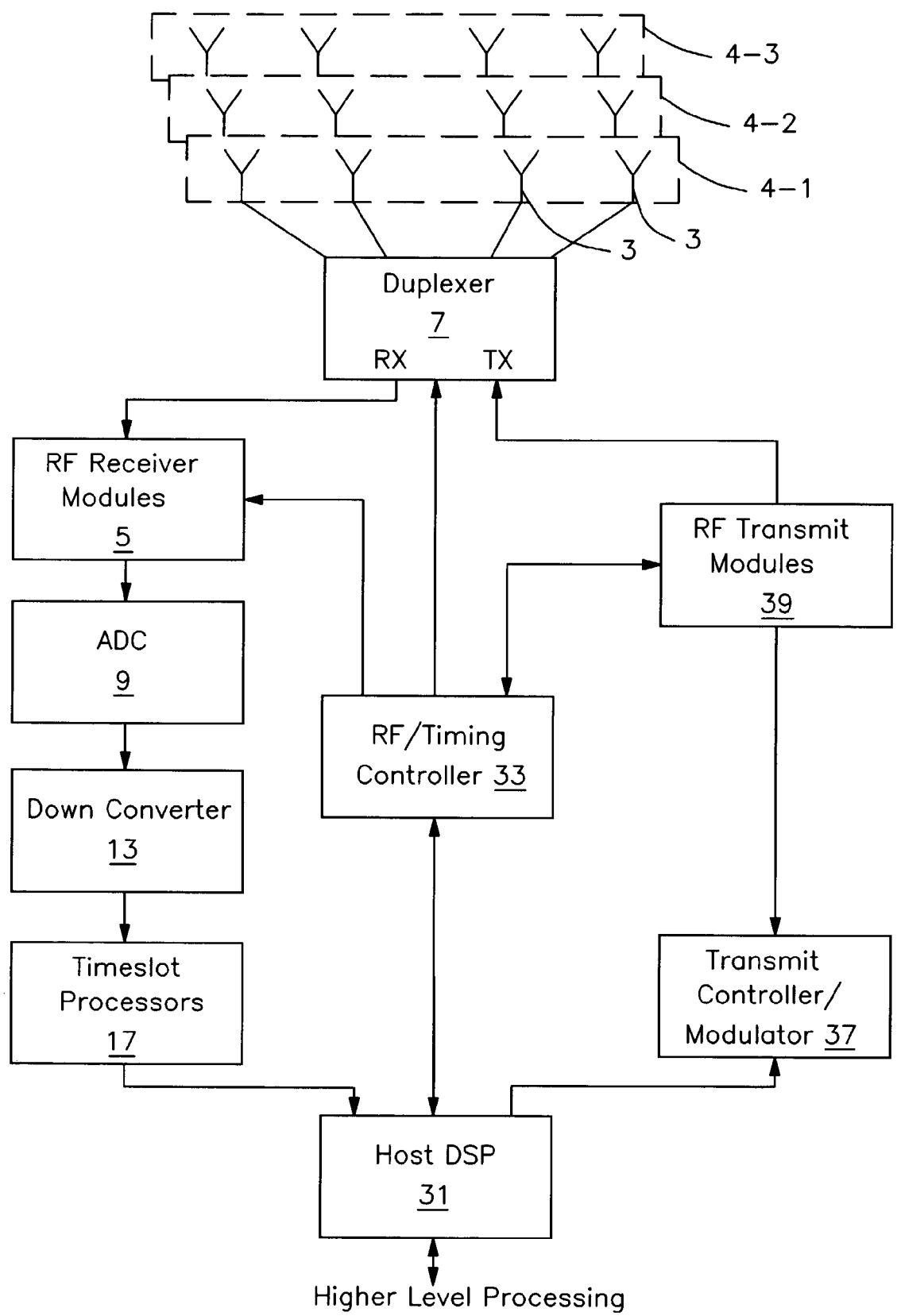
FIG. 5 is a simplified block diagram of a base station on which an embodiment of the invention can be implemented.
Figure 6:
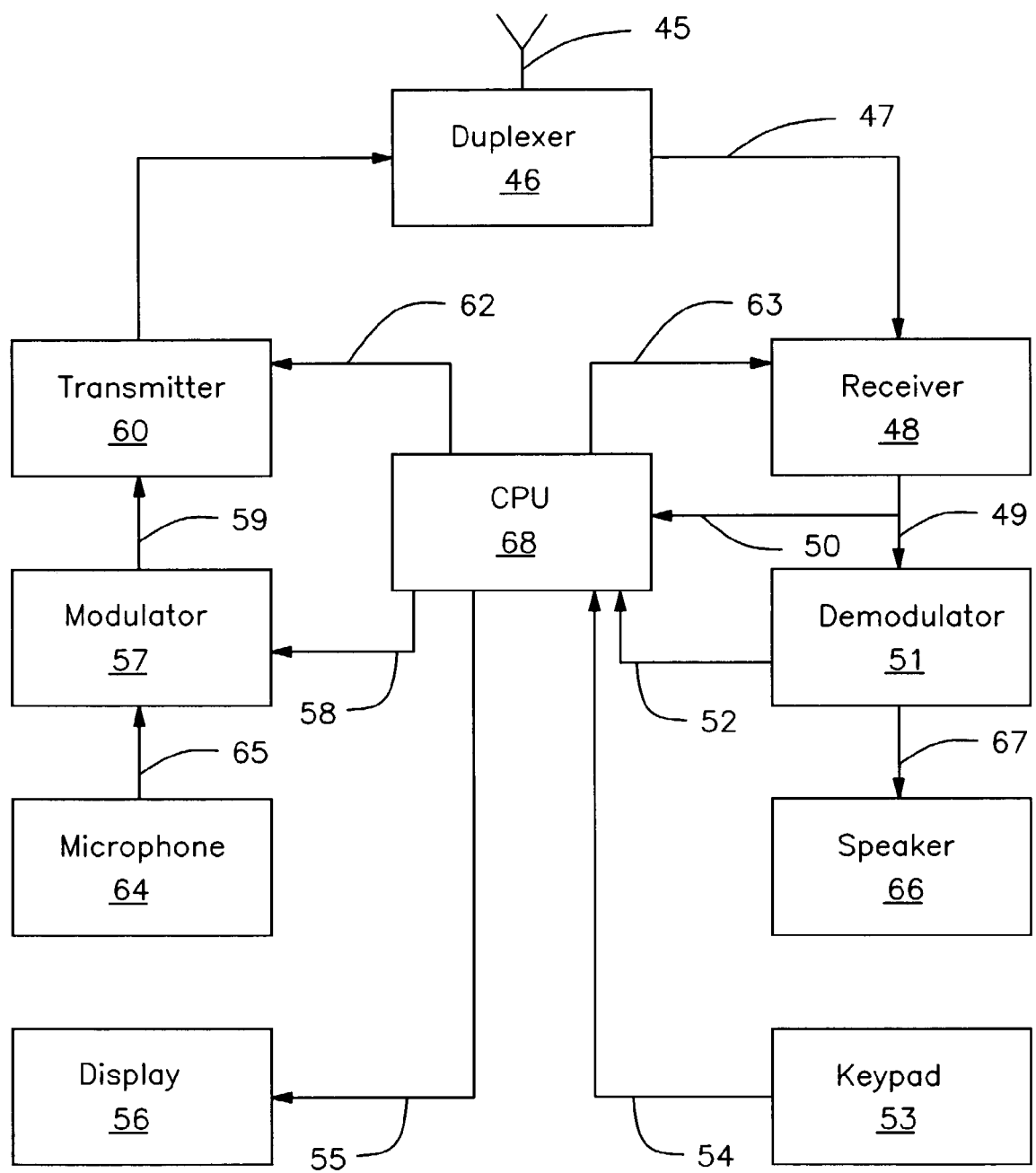
FIG. 6 is a simplified block diagram of a remote terminal on which an embodiment of the invention can be implemented

In an alternative embodiment, the regular receiver circuit 511 operates on IF (intermediate frequency) signals. In the examples of FIGS. 5 and 6, the base station can operate on baseband signals as described above, while the user terminal can operate on IF signals. The EPEC can be adapted accordingly so that the received signal 508 is an IF signal intercepted before it reaches the receiver 511 and the corrected output 510 is also an IF signal. The EPEC then performs the estimation and correction operations described above on the IF signals. The A/D converter in such a case is incorporated into the receiver. Alternatively, the IF signals can be sampled IF signals so that the A/D converter is located as shown in FIG. 1.

The EPEC of FIG. 2 performs the same operations for each of the taps being used by the user terminal receiver circuit. In FIG. 2, n taps are shown but the particular number of taps will depend on the design of the receiver and the requirements of the wireless network. Also depending on the design of the receiver, the phase error estimation can be determined by the receiver 511 instead of the estimator circuits 525 of the EPEC. These estimates can be passed to the EPEC on the data line 517 that carries codes and delay information or on a separate dedicated line.

The temporal location of the taps (delays) that are used for each pilot signal can also be provided to the EPEC from the regular receiver circuit. In some systems, dedicated pilot symbols are used in the transmission. Information regarding the location of these symbols can also be provided to the EPEC using the data line 517. Alternatively, this and much of the other date can be stored in or derived by the EPEC. The EPEC can be designed to accommodate a variety of different receiver circuits and different levels of available information.

The EPEC can use the information regarding the codes of the pilot and traffic channels, the location of possible dedicated pilot symbols, and the temporal location of the taps to estimate the phase (and amplitude) of all taps required by the receiver. The EPEC can also compensate for frequency errors in the input signal. With these estimates, the phase and optionally the amplitude of the pilot signal can be corrected so that its taps will better match the phases and amplitudes of the traffic channel taps. The correction can be accomplished simply using a signal that is added to the ordinary baseband or IF signal.

In one embodiment, the correction can be made using an angle q, where the phase of the pilot tap differs by q radians from the phase of the traffic or other user specific signal. The angle q can be defined so that if the pilot signal is multiplied with $\exp(i^* q)$, then the new phase of the pilot signal agrees with the phase of the user specific signal. Given a complex base band pilot signal x_p(t), adding the signal $-x\_p(t)+\exp(i^* q)^*x\_p(t)=(\exp(i^* q)-1)^*x\_p(t)$ to the input base band signal results in the corrected base band signal containing a pilot signal with the correct phase.

This correction can be improved by not only correcting for the phase difference between the pilot signal and the user specific signal, but also correcting for any differences in amplitude. The error complex gain of the pilot signal can be g, defined such that if the pilot signal is multiplied by g, then the complex gain of the pilot signal agrees with the complex gain of the user specific signal, except for a possible common real scale factor common to all taps. In this case, the signal (g−1)*x_p(t) is added to the input base band signal to correct the gain.

In an alternative embodiment, for example as applied to the downlink channel in HDR, the present application can be applied to a TDMA communications system. In HDR, and in other packet data transmission systems, a single burst is divided into payload directed to different specific users but the training portion of the burst is shared. That is, the burst is divided into time-slots which also have training sequences. The pay-load part of a time slot is most often intended for a specific user. All users in a sector listen to the training sequence in order to report on the channel quality to a base station scheduler. The base station scheduler uses the reports to schedule the user-specific packets. It is possible to transmit different portions of the burst using different spatial parameters, however, this causes a difference in phase between the training portion and the payload portion.

In effect, there is a common training portion and the payload is divided up among the users. The external estimator can be used to correct phase errors between the common training portion and a user-specific payload portion. Such an embodiment can be considered as a special case in which the scrambling code is all ones and the code multiplexing realized by the scrambling codes is replaced with time multiplexing of the training sequence and the payload or traffic signal. It can also be constructed by replacing the code division components with appropriate time division components.

In a TDMA system the phase of the payload symbols and the phase of the training sequence symbols can first be estimated, then a correction signal can be added to the training sequence that would correct for its phase and/or amplitude error, just as for the pilot signal in a CDMA system as described above. In the case of a TDMA system, the EPEC can be provided with information about the training sequence and its timing. If the regular receiver circuit uses only some taps in the channel then the EPEC can receive information also on that. AGC and frequency control data are also useful for the EPEC as it is with CDMA systems.

Phase Error Estimation Methods

The channel mismatch between the traffic channel beam and the beam of the pilot channel can be corrected using known symbols in the traffic channel. The user terminal can compensate for the phase error in several different ways. One way is by estimating the phase of the traffic channel constellation and de-rotating it back to the closest constellation point. The estimate can be improved upon by using a small number of known symbols transmitted on the traffic channel to resolve any ambiguity as to which nearest constellation point the signal constellation should be rotated. The phase error compensation can be performed on a per tap basis or after combining the taps in a RAKE receiver. Another way is by re-estimating the traffic channel propagation channel by using the known symbols transmitted by the base station on the traffic channel and using the channel estimated using the sector wide pilot signal.

Using the channel estimated from the sector wide pilot together with a small number of known symbols in the traffic channel requires fewer known symbols in the traffic channel than if only the pilot channel or only the traffic channel were used. If transmit diversity is used, two variations of the pilot can be used, one for each diversity signal.

Figure 3:
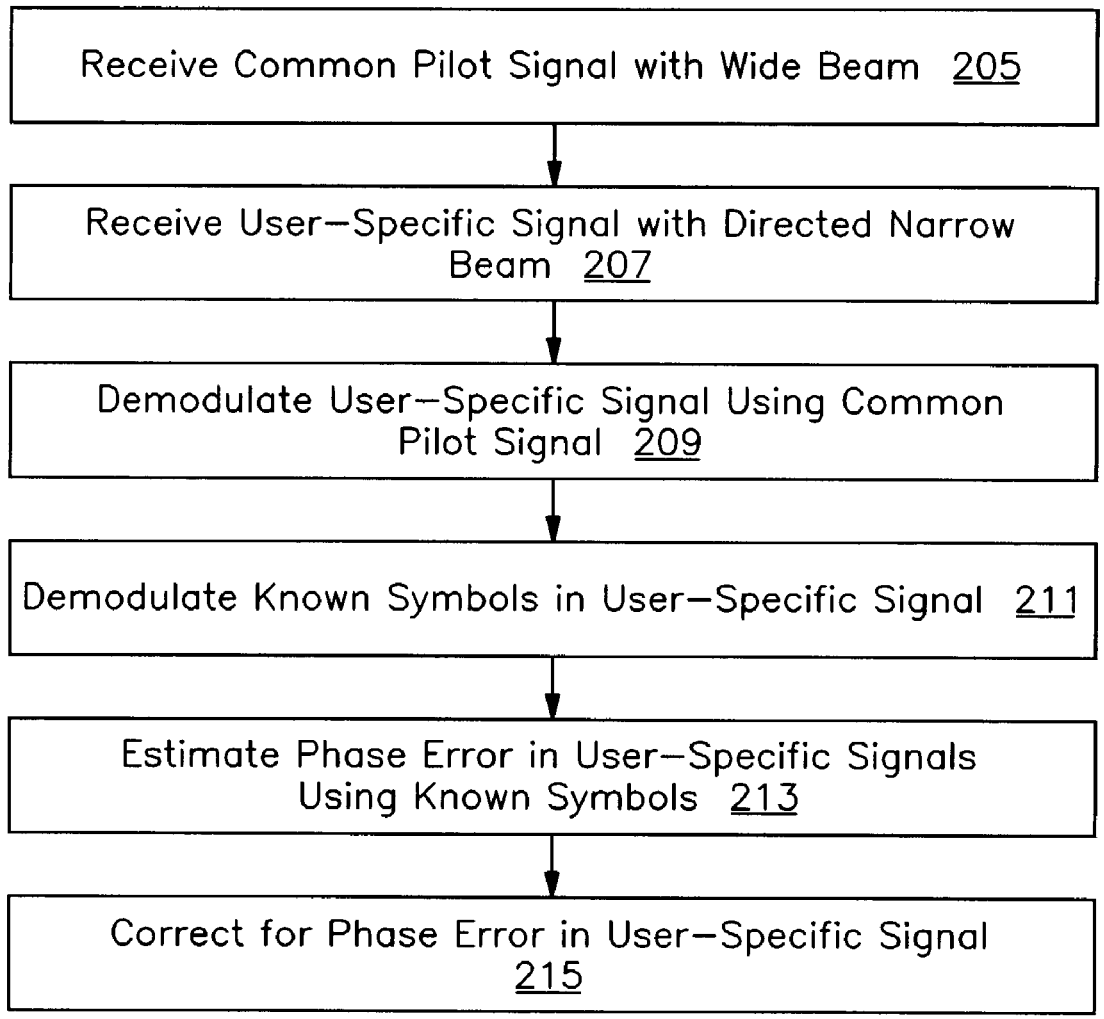
FIG. 3 is a flow chart showing one embodiment of the present invention.

FIG. 3 shows a process flow diagram for optimizing parameters in accordance with the present invention. This process is described in the context of a user terminal (UT) receiving signals from a base station (BS), in a network that includes many base stations, sending signals to any UT's (or subscriber stations or remote terminals) that may be within range of the base stations.

First the UT receives a common pilot signal that was transmitted with a wide beamwidth 205. Many standards for CDMA require such a common pilot signal that is used by all of the UT's within range of one or several base stations. Typically, the common pilot signal is a single sector-wide signal, however, it can also be directed to any type of sub-sector instead. The common pilot provides timing and phase information for demodulating any other signals. The UT also receives a user-specific signal with a directed narrow beamwidth 207. This signal can be a user-specific pilot signal, a traffic channel signal, a control channel signal or any other signal intended only for this particular user. The user-specific signal is received on a different signal propagation path from the common pilot signal due to the difference in beamwidth or in other transmission parameters.

The UT can then demodulate the user-specific signal using the common pilot signal 209, however, this demodulation will be subject to errors due to the differences in the two signals. Accordingly, the UT identifies and demodulates a predetermined set of known symbols in the user-specific signal 211. Because the symbols are known, they can be used to estimate the phase error in the demodulated user-specific signal 213. The estimated phase error can then be applied to correct for the phase error in the whole user-specific signal 215. The short sequence of known symbols is insufficient for training or to acquire timing but long enough only to allow the UT to perform a phase error estimate on the user-specific signal.

The phase errors can be resolved in a multiple tap receiver separately for each tap or as a resulting phase error in a signal combined from many taps in a RAKE receiver. In one embodiment, the known sequence is sufficient only to resolve ambiguities in the phase error of the demodulated user-specific signal. Note that in the present embodiment, the user-specific signal is first demodulated using the pilot signal. Only after this first pass is the known sequence used. This can be done by first establishing taps or complex gains of a multiple tap receiver using only the common pilot signal and applying those established taps to receive the user-specific signal. Then the phase error is estimated using the known symbols of the user-specific signal and this is used to establish replacement taps or complex gains for the multiple tap receiver, or a phase rotation to apply to the output of a RAKE receiver that uses the common pilot signal for channel estimation. The user-specific signal is then demodulated again using the replacement taps or using the RAKE receiver using the common pilot signal followed by the correcting phase rotation.

Figure 4:
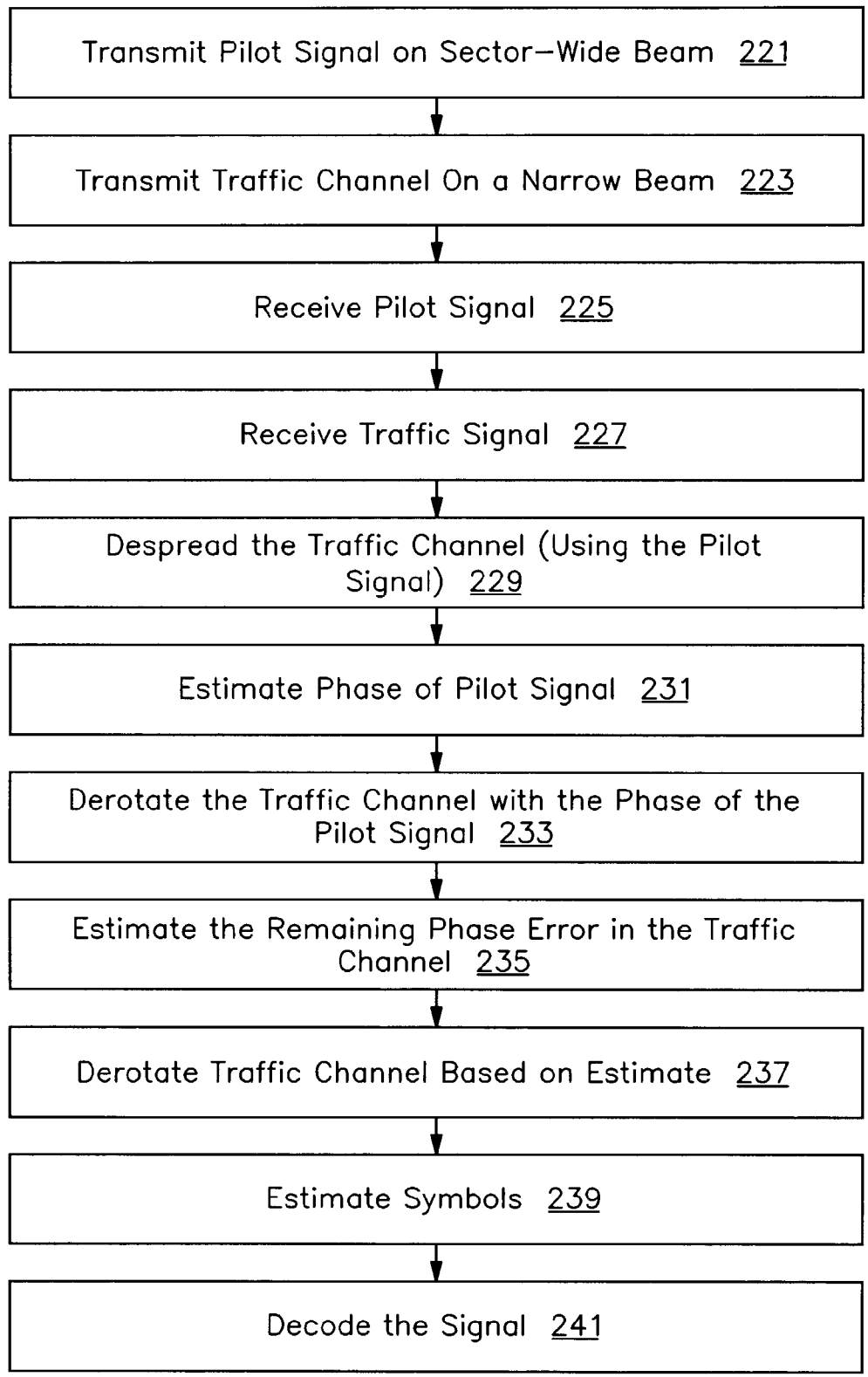
FIG. 4 is a flow chart showing the embodiment of FIG. 1 in greater detail.

FIG. 4 shows a more specific embodiment of the invention described with reference to FIG. 1 and considering both the transmitting station and the receiving station. Again in this case, the invention is described from the perspective of a base station transmitting to a user terminal, but the invention is not so limited. First, the base station transmits a pilot signal on a sector-wide beam 221. It also transmits one or more traffic channel signals 223 on a beam with weights that have been selected to minimize required transmit power using e.g. spatial diversity technologies from an antenna array.

The UT receives the pilot signal 225 and the traffic signal 227, and despreads the traffic channel signal using the pilot signal 229. The UT then estimates the phase of the pilot signal 231 and derotates the traffic channel signal 233 with the phase of the pilot signal. This is performed separately for each tap used. The pilot signal and the traffic signal necessarily differ slightly in phase so this derotation step is inherently in error. Accordingly, the UT next estimates the remaining phase error in the traffic channel 235 using any one of a variety of different ways. As mentioned above, this phase error can be estimated on a tap by tap basis or as a phase error of the signal combined from several taps in a RAKE receiver using the common pilot signal for channel estimation.

One way to estimate the phase error is to estimate the phase blindly from the traffic channel using the distribution of the phases of the derotated traffic channel symbols. To do this, the user terminal estimates the rotation of the signal constellation on the traffic channel. As long as the phase error of the traffic channel is less than half of the minimum phase difference between two symbols, the phase can, without ambiguity, be rotated back to its correct position. This derotation can either be done on a tap by tap basis or on the signal combined from several taps. This estimation process can be applied to TDMA systems as well as to CDMA systems using well-known signal estimation techniques.

As one example, the phase error can be estimated based on an analysis of histograms over the phases of the despread symbol samples. The histograms can be built up using FFT's (fast fourier transforms). If there is no phase error, then, in for example a QPSK (quarternary phase shift keying) signal, such a histogram should have four peaks aligned with the phases of the symbols in the signal constellation. By estimating how much the peaks deviate from these locations, the phase error in the dedicated channels can be estimated and corrected. The histograms can be plotted as a curve and a sine wave fitted to the histogram curve. The phase of the sine wave can be used as an estimate of the phase error in the traffic channel. Using this approach on a QPSK signal received with about 2 db SNR (signal to noise ratio), it is possible to estimate the phase error to an accuracy of about 10 degrees or less.

Another way to estimate the phase error is to use the phases of dedicated pilot symbols transmitted in the traffic channel or other dedicated channel. The phase error can be estimated for each tap or only for the combined signal from all taps. If the base station periodically transmits a few known symbols on the traffic channel, then these symbols can be used to estimate the phase error of the traffic channel, either tap by tap or on a combined signal from several taps or both. The phase of the traffic channel (taps) can be estimated using well known techniques for channel estimation. This approach to phase error estimation is not limited to phase errors within any particular range. It can also be adjusted to accommodate a range of different signal to noise ratios by adjusting the number of known symbols that are transmitted in the dedicated channel.

A third way to estimate the phase error is to estimate the phase blindly from the traffic channel using the distribution of the phases of the derotated traffic channel symbols and use the phases of some dedicated pilot symbols to resolve any ambiguity in which way to derotate the traffic channel. This approach combines the two ways described above. The blind correction approach can be used to estimate the phase of the traffic channel up to an ambiguity, the ambiguity being the signal constellation point to which the traffic channel should be derotated. The small number of known symbols in the traffic channel can then be used to resolve the ambiguity, i.e. to select the signal constellation point.

In another embodiment, the known symbols in the traffic channel can be used to re-estimate the value of all the taps detected in the pilot signal channel. This may require more known symbols to be transmitted than compensating for the phase of the taps or the phase of the combined signal from all taps. In any of the examples described above, by using a channel estimate from the pilot signal channel, a better channel estimate can be derived than can be done using only the known symbols of the traffic channel.

It has been found that in signals structured in accordance with the WCDMA standards, acceptable results can be obtained using one dedicated pilot symbol per slot during one frame. This amounts to using a total of 15 dedicated pilot symbols, spread out over one WCDMA frame (10 ms long). An estimate of the phase error in the traffic channel can be developed using the above techniques with an error of about 10 degrees or less. One dedicated pilot symbol per slot amounts to about 5% of the total 'space' in each slot. The phase error of 10 degrees gives only a very small degradation in the performance.

All of the approaches described above significantly reduce the sensitivity of the receiver to the differences between a beam formed traffic channel and a sector-wide pilot signal. The reduction in this sensitivity can greatly improve the receiver's performance.

Finally having estimated the phase error, the traffic channel is derotated with the estimated phase error 237. This can be done on the combined signal after all taps are combined or on a per tap basis before combining. Alternatively the channel for the user can be completely re-estimated using information of where the taps are from the pilot signal and estimates of the complex gains of each tap based on the dedicated pilot symbols. It may also be possible to use the estimates of the tap complex gains as a priori information. With the phase error corrected, the traffic channel symbols can be estimated 239 and the signal decoded 241.

Base Station Structure

In one embodiment as discussed above, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Techniques well known in the art, can be used to exploit the properties of the training sequences in determining spatial parameters. Further details regarding the use of spatial division and SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

(SDMA) technology can be combined with other multiple access systems, such as time division multiple access (TDMA), frequency division multiple access (FDMA) and code division multiple access (CDMA). Multiple access can be combined with frequency division duplexing (FDD) or time division duplexing (TDD).

FIG. 5 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 3. The base station may be connected to a wide area network (WAN) through its host DSP 31 for providing any required data services and connections external to the immediate wireless system.

To support spatial diversity, a plurality of antennas 3 is used to form an antenna array 4, for example four antennas, although other numbers of antennas may be selected. Each antenna is an element of a four-element array 4. And a plurality of arrays are provided 4-1, 4-2, 4-3. The antenna elements may have a spacing of from one-quarter to four wavelengths of a typical carrier frequency while the arrays may be separated by ten or twenty wavelengths. The best spacing for spatial diversity will depend upon the particular frequencies involved, the physical installation and other aspects of the system. In many applications, the spacing between antenna elements of each array can be less than two wavelengths of the received signal. The spacing between antenna arrays can be more than two wavelengths of the received signal. In general, the spacing between elements in an array is selected to minimize grating lobes when transmissions from each element are coherently combined. In an alternative approach, the arrays are spaced apart so as to form a uniform array of elements. The distance between nearest elements in different arrays is the same as the spacing between elements within an array. As mentioned above, it is also possible for each array to have only a single element.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 31 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences.

Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

FIG. 6 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 2 and 3, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base station's could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. An external error correction circuit comprising:
   a signal input to receive training and traffic channel signals from a receive chain;
   a signal processing circuit to estimate an error in phase between the training and traffic channel signals and to compute phase corrections to at least one of the training and traffic channel signals to correct for the estimated phase error; and
   a signal generator to supply a compensation signal to the receive chain to effect the computed correction.

2. The circuit of claim 1, wherein the training signal is a pilot signal and wherein the signal processor computes phase corrections to improve matching of significant taps of the pilot and traffic channel signals.

3. The circuit of claim 2, further comprising a data input to receive temporal locations of the taps of the pilot signal.

4. The circuit of claim 2, wherein the computed phase corrections comprise phase corrections of taps of the pilot signal.

5. The circuit of claim 4, wherein the signal processing circuit further computes amplitude corrections of taps of the pilot signal.

6. The circuit of claim 1, wherein the signal processing circuit further computes estimates of the phases and amplitudes of taps of the training and traffic channel signals and computes phase and amplitude corrections using the estimates.

7. The circuit of claim 1, wherein the signal processing circuit comprises a single finger RAKE receiver.

8. The circuit of claim 1, wherein the training signal comprises a pilot signal, the circuit further comprising a data input to receive the locations of dedicated pilot symbols within the pilot signal.

9. The circuit of claim 1, wherein the training signal is a pilot signal, the circuit further comprising a data input to receive spreading and scrambling codes for the pilot and traffic channel signals.

10. The circuit of claim 9, wherein the signal processing circuit comprises a despreader and a derotator.

11. The circuit of claim 10, wherein the despreader despreads the pilot and traffic channel signals with the spreading codes from the data input.

12. The circuit of claim 10, wherein the derotator derotates the phase of the despread traffic signal with an estimated phase of the despread pilot signal.

13. The circuit of claim 10, wherein the derotator derotates the phase of the despread traffic signal by adjusting the taps of a multiple tap filter on a tap-by-tap basis.

14. The circuit of claim 1, further comprising a summer to add the compensation signal to the received training and traffic channel signals, the summer having an output with a corrected training signal.

15. The circuit of claim 1, further comprising a frequency input to receive a frequency error to be applied to the training and traffic channel signals by the signal processing circuit.

16. The circuit of claim 1, further comprising an automatic gain control input.

17. The circuit of claim 1, wherein the signal input comprises a baseband signal input to receive signals in a baseband form.

18. The circuit of claim 17, further comprising a baseband signal output to output a compensation signal in baseband form.

19. The circuit of claim 1, wherein the signal input comprises an intermediate frequency signal input to receive signals at an intermediate frequency and an intermediate frequency signal output to output a compensated training signal in intermediate frequency form.

20. The circuit of claim 1, wherein the training and traffic channel signals are time multiplexed, the circuit further comprising a demultiplexer to separate the training and traffic channel signals.

21. A method comprising:
   receiving training and traffic channel signals from a receive chain;
   estimating an error in phase between the training and traffic channel signals;
   computing phase corrections to at least one of the training and traffic channel signals to correct for the estimated phase error; and
   generating a compensation signal to effect the computed correction.

22. The method of claim 21, wherein the training signal is a pilot signal and wherein computing phase corrections comprises computing phase corrections to improve matching of significant taps of the pilot and traffic channel signals.

23. The method of claim 22, further comprising receiving temporal locations of the taps of the pilot signal.

24. The method of claim 21, further comprising receiving the locations of dedicated pilot symbols within the pilot signal.

25. The method of claim 21, wherein the training signal is a pilot signal, the method further comprising receiving spreading and scrambling codes for the pilot and traffic channel signals.

26. The method of claim 25, further comprising despreading the pilot and traffic channel signals with the spreading codes from the data input.

27. The method of claim 21, further comprising adding the compensation signal to the received training and traffic channel signals to produce an output with a corrected training signal.

28. The method of claim 21, wherein receiving signals comprises receiving signals in a baseband form.

29. The method of claim 28, wherein generating a compensation signal comprises generating a compensation signal in baseband form.

30. The method of claim 21, wherein receiving a signal comprises receiving signals at an intermediate frequency wherein generating a compensation signal comprises generating a compensated training signal in intermediate frequency form.

31. The method of claim 21, wherein the training and traffic channel signals are time multiplexed, the method further comprising demultiplexing the training and traffic channel signals.

32. A machine-readable medium having stored thereon data representing instructions which, when executed by a machine, cause the machine to perform operations comprising:
   receiving training and traffic channel signals from a receive chain;
   estimating an error in phase between the training and traffic channel signals;
   computing phase corrections to at least one of the training and traffic channel signals to correct for the estimated phase error; and
   generating a compensation signal to effect the computed correction.

33. The medium of claim 32, wherein the training signal is a pilot signal and wherein computing phase corrections comprises computing phase corrections to improve matching of significant taps of the pilot and traffic channel signals.

34. The medium of claim 33, further comprising instructions which, when executed by the machine, cause the machine to perform further operations comprising receiving temporal locations of the taps of the pilot signal.

35. The medium of claim 32, further comprising instructions which, when executed by the machine, cause the machine to perform further operations comprising adding the compensation signal to the received training and traffic channel signals to produce an output with a corrected training signal.

36. The medium of claim 32, wherein the instructions for generating a compensation signal comprise instructions which, when executed by the machine, cause the machine to perform further operations comprising generating a compensation signal in baseband form.

37. The medium of claim 32, wherein the instructions for receiving a signal comprise instructions which, when executed by the machine, cause the machine to perform further operations comprising receiving signals at an intermediate frequency wherein generating a compensation signal comprises generating a compensated training signal in intermediate frequency form.

38. The medium of claim 32, wherein the training and traffic channel signals are time multiplexed, the medium further comprising instructions which, when executed by the machine, cause the machine to perform further operations comprising demultiplexing the training and traffic channel signals.

39. A user terminal in a radio communications system comprising:
   a receive chain to receive training and traffic channel signals;
   a signal input to receive the training and traffic channel signals from the receive chain;
   a signal processing circuit to estimate an error in phase between the training and traffic channel signals and to compute phase corrections to at least one of the training and traffic channel signals to correct for the estimated phase error; and
   a signal generator to supply a compensation signal to the receive chain to effect the computed correction.

40. The user terminal of claim 39, wherein the training signal is a pilot signal and wherein the signal processor computes phase corrections to improve matching of significant taps of the pilot and traffic channel signals.

41. The user terminal of claim 39, wherein the signal processing circuit further computes estimates of the phases of taps of the training and traffic channel signals before computing phase corrections.

42. The user terminal of claim 39, wherein the training signal comprises a pilot signal, the circuit further comprising a data input to receive the locations of dedicated pilot symbols within the pilot signal.

\* \* \* \* \*